United States Patent
Lai et al.

(10) Patent No.: US 8,968,548 B2
(45) Date of Patent: Mar. 3, 2015

(54) METHOD OF FORMING MULTICOLOR SURFACE

(75) Inventors: Feng-Ju Lai, Taipei (TW); Shao-Kang Hu, Tainan (TW)

(73) Assignee: Catcher Technology Co., Ltd., Tainan (TW)

( * ) Notice: Subject to any disclaimer, the term of this patent is extended or adjusted under 35 U.S.C. 154(b) by 272 days.

(21) Appl. No.: 13/470,290

(22) Filed: May 12, 2012

(65) Prior Publication Data
US 2013/0299357 A1    Nov. 14, 2013

(51) Int. Cl.
| | |
|---|---|
| *C25D 11/14* | (2006.01) |
| *C25D 11/16* | (2006.01) |
| *C25D 11/24* | (2006.01) |
| *C25D 11/12* | (2006.01) |

(52) U.S. Cl.
USPC ........... 205/202; 205/118; 205/213; 205/214; 205/221

(58) Field of Classification Search
CPC .......... C25D 5/02; C25D 11/14; C25D 11/16; C25D 11/24; C25D 11/12
USPC ........................ 205/202, 213, 214, 221, 218
See application file for complete search history.

(56) References Cited

U.S. PATENT DOCUMENTS

| | | | |
|---|---|---|---|
| 4,444,628 A * | 4/1984 | Furukawa et al. | 205/202 |
| 2008/0105547 A1* | 5/2008 | Tong | 204/510 |
| 2010/0051467 A1* | 3/2010 | Tian et al. | 205/118 |

FOREIGN PATENT DOCUMENTS

| | | |
|---|---|---|
| CN | 101665969 A | 3/2010 |
| TW | 201016891 A | 5/2010 |

* cited by examiner

*Primary Examiner* — Keith Hendricks
*Assistant Examiner* — Stefanie S Wittenberg
(74) *Attorney, Agent, or Firm* — Li & Cai Intellectual Property (USA) Office

(57) ABSTRACT

A method of producing a multicolor surface is described herein. The method includes the following steps: providing an aluminum-based substrate having an outer and inner surfaces; performing a mechanical process on the substrate; forming at least one fixing portion on the inner surface of the substrate; forming at least one conductive hole on the fixing portion; performing a first anodization on the substrate to form a first oxide layer that can be dyed with a first color on the outer surface of the substrate; removing at least some of the first oxide layer from the fixing portion and the outer surface of the substrate; performing a second anodization on the substrate to form a second oxide layer that can be dyed with a second color on the exposed outer surface of the substrate stripped of the first oxide layer; and removing the fixing portion.

11 Claims, 4 Drawing Sheets

METHOD OF FORMING MULTICOLOR SURFACE

BACKGROUND OF THE INSTANT DISCLOSURE

1. Field of the Instant Disclosure

The instant disclosure relates to a method of forming a multicolor surface; in particular, to a method of forming various colors and surface effects on a substrate through multiple anodic treatments.

2. Description of Related Art

Mobile electronic devices, such as cell phones, personal digital assistants (PDAs), and computers, are being widely used today. Generally, consumers are more attracted by products which are aesthetically appealing. Therefore, housings of various electronic devices usually have shiny and smooth metallic surfaces manufactured by various processing means.

In particular, anodic oxidation is being utilized for dyeing the metallic housings. Nevertheless, by using such means, only one single color can be formed on the housing surface without other color variations.

To form oxide layers having different colors on a metallic housing, the housing may undergo multiple anodizations and dyeing processes. Specifically, a masking ink is used to cover areas of the metallic housing not to be surface treated. After the anodization has been completed, the masking ink is then removed. Such process is more complicated and requires additional expenses for the masking procedure, thus incurring a higher manufacturing cost.

Another existing method of forming a two-color housing is to partially remove a first oxide layer from the outer surface of the housing after the first anodization. Then, a second oxide layer that can be dyed with a second color is formed by a second anodization. In order to overcome the conducting problem for the second anodic oxidation, one solution is to remove the first oxide layer from the inner surface of the housing by means of grinding to provide a conductive area for the electrodes. However, such method has limitations in that the removed thickness of the first oxide layer is uneasy to control, where too much grinding may damage the housing. Whereas if the first oxide layer is not totally removed from the inner surface of the housing, the conductivity may suffer and negatively impact the second anodic treatment. Furthermore, if a third color is preferred to be formed on the housing, the same grinding process must be repeated, which further increases the risk of damaging the housing.

Therefore, it is an urge for the industry to find a method of producing multiple colors on the housing surface.

To address the above issues, the inventors strive via industrial experience and academic research to present the instant disclosure, which can effectively improve the limitations described above.

SUMMARY OF THE INSTANT DISCLOSURE

The object of the instant disclosure is to provide a method of forming a multicolor surface. Specifically speaking, at least one fixing portion is formed on the substrate capable of being engaged by the processing machine and providing conductive area for the electrodes during the anodic treatments. Therefore, multiple oxide layers having different colors can be formed on the metallic substrate through the anodic treatments.

In order to achieve the aforementioned objects, according to an embodiment of the instant disclosure, a method of forming a multicolor surface is provided, comprising the following steps:

providing an aluminum-based substrate having an outer surface and an inner surface;

performing a mechanical process on the substrate;

forming at least one fixing portion on the inner surface of the substrate;

forming at least one conductive hole on the fixing portion;

performing a first anodic treatment on the substrate to form a first oxide layer that can be dyed with a first color on the substrate;

removing at least some of the first oxide layer from the fixing portion;

removing at least some of the first oxide layer from the outer surface of the substrate;

performing a second anodic treatment on the substrate and connecting the leads of the electrode to the exposed fixing portion, where a second oxide layer that can be dyed with a second color is formed on the exposed outer surface of the substrate; and removing the fixing portion.

Based on the above, the instant disclosure has the following advantages. The fixing portion on the inner surface of the substrate acts as a conductive area for the electrodes during the anodic treatment. Therefore, the conductivity of the second anodic treatment can be maintained without the need of grinding, thus lowering the risk of damaging the substrate. Furthermore, upon removal of the fixing portion, the substrate will not be affected aesthetically.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
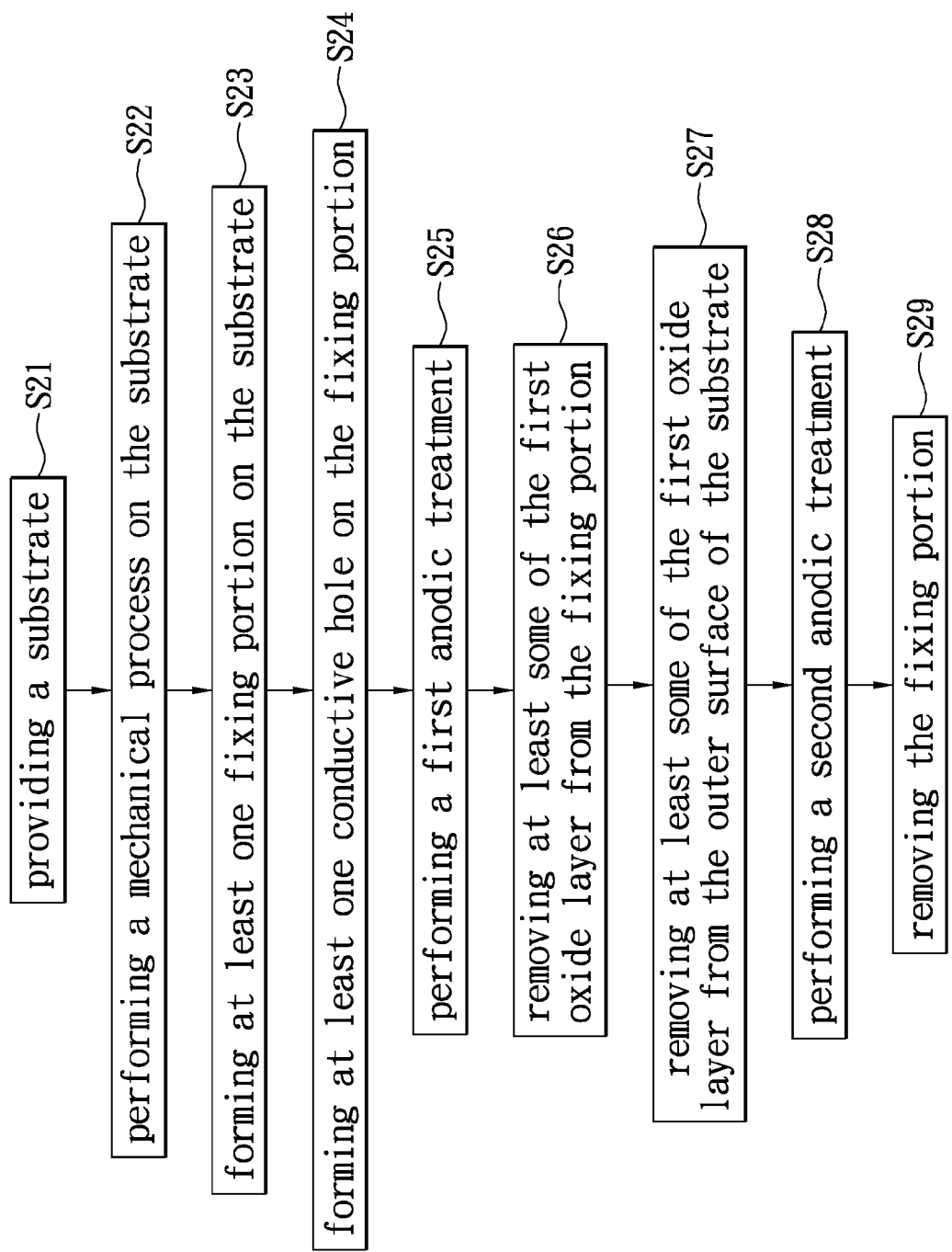
FIG. 1 shows a flowchart of a method of forming a multicolor surface in accordance to the instant disclosure.

Please refer to FIG. 1, which shows a flowchart of a method of forming a multicolor surface in accordance to the instant disclosure. First, a substrate is provided (step S21), where the substrate is a metallic housing made of aluminum or aluminum alloy suitable for anodic treatment.

In order to provide a substrate having a required appearance, such as the housing of electronic devices, as indicated by a step S22, the substrate is subjected to a mechanical process. The mechanical process may refer to a collection of material-working processes. Typically, the computer numerical control (CNC) machining process is utilized. The program commands of the numerical control are inputted into the memory device of the digital control system for compilation by a computer. The information is then transmitted to the driver to drive the motor through the displacement control system to machine the component. Notably, the aforementioned mechanical process can further include a texturizing process.

Figure 2:
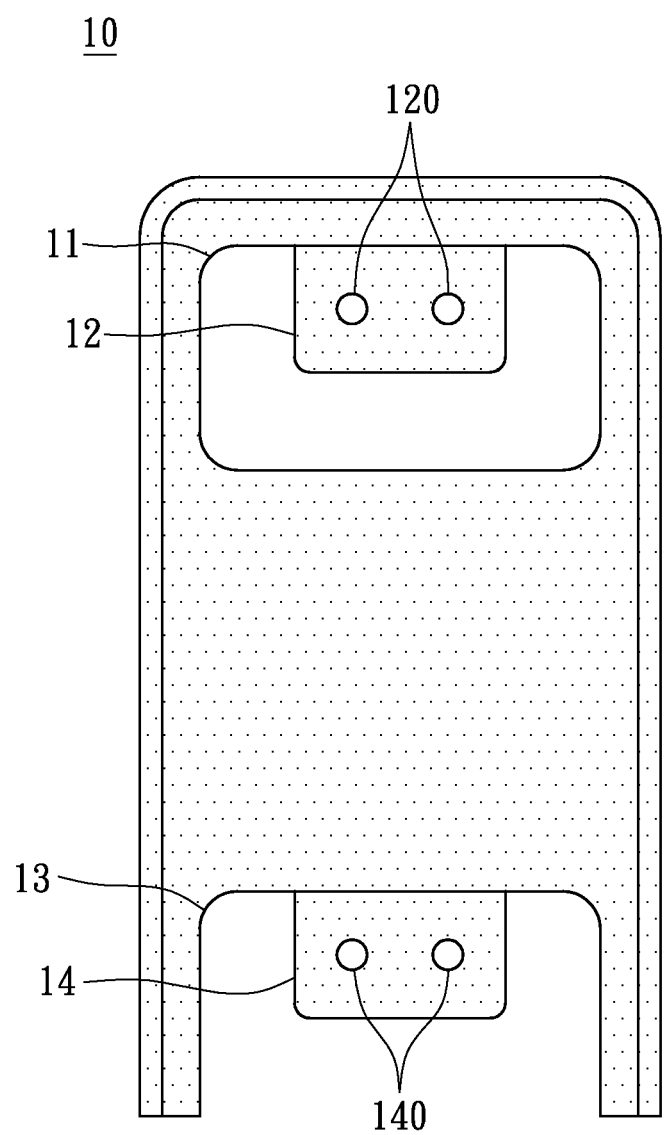
FIG. 2 shows a schematic view of the formation of a pair of fixing portions on a substrate in accordance to the instant disclosure.

The machined component, referred herein as a substrate 10, is shown in FIG. 2. The substrate 10 has an inner surface and an outer surface. The outer surface is the outer appearance of the electronic housing, and the inner surface is the surface proximate to the internal components of the electronic product. It is worth noting the forming method of the instant disclosure is not limited to housings of electronic products.

Next, for step S23 applied to the instant embodiment, a pair of fixing portions 12 and 14 is formed on the substrate 10. The fixing portions 12 and 14 are utilized by the CNC machine for selectively engaging thereto, where the number of fixing portions is not limited. Since the fixing portions 12 and 14 are arranged on the inner surface of the substrate 10, the removal of the fixing portions 12 and 14 during the post-anodic treatment will not affect the appearance of the substrate 10 aesthetically. It is worth noting the fixing portions 12 and 14 can be formed prior to the machining step S22. Then, the CNC machine is fixed to the fixing portions 12 and 14 to machine the substrate 10 or perform surface treatment on the substrate 10. In other words, there is no specific sequence for steps S22 and S23. The two steps can be deemed as different procedures in a single step.

Next, for step S24, at least one conductive hole is formed on each of the fixing portions 12 and 14. Referring again to FIG. 2, preferably, a pair of conductive holes 120 is formed on the fixing portion 12, while another pair of conductive holes 140 is formed on the fixing portion 14. The easiest way to form the conductive holes is by drilling. The main functions of the conductive holes 120 and 140 are to provide conductivity and fastening capabilities for the substrate 10 during the first anodic treatment. For the instant embodiment, the substrate 10 further includes openings 11 and 13 formed thereon, where the fixing portions 12 and 14 are arranged in the openings 11 and 13, respectively. The openings 11 and 13, however, can be omitted depending on the operational requirement and practical needs.

Before the first anodic treatment (step S25), taking a housing of the electronic device for example, the instant disclosure further includes a cleaning process of the substrate 10. The cleaning process includes procedures such as degreasing, alkaline etching, first pickling, chemical polishing, and second pickling. The number of the same procedures that is to be repeated depends on the quality requirement of the aluminum alloy substrate. Furthermore, at least one water rinsing process is implemented following each aforementioned cleaning procedure, and the number of water rinsing processes can range from one to five. Preferably, two water rinsing processes are suggested to adequately remove chemical agents and other impurities from the substrate 10. The parameters of each cleaning procedure are listed in Table 1 herein below:

TABLE 1

| Cleaning | | Parameter | |
|---|---|---|---|
| Procedure | | Parameter 1 | Parameter 2 |
| Cleaning Process | Degreasing | Degreasing agent: 1-50% | Temperature: 10-90° C. |
| | Water rinsing | Temperature: 5-95° C. | 1-5 times |

TABLE 1-continued

| Cleaning | Parameter | |
|---|---|---|
| Procedure | Parameter 1 | Parameter 2 |
| Alkaline etching | Alkali: 50-500 g/L | Temperature 10-90° C. |
| Water rinsing | Temperature: 5-95° C. | 1-5 times |
| Chemical polishing | Acid: 1-85% | Temperature: 10-90° C. |
| Water rinsing | Temperature: 5-95° C. | 1-5 times |
| Pickling | Acid: 50-500 ml/L | Temperature: 10-90° C. |
| Water rinsing | Temperature: 5-95° C. | 1-5 times |

Practically, each of above listed cleaning procedures can be adjusted according to the condition of the aluminum alloy and the applied situation. The instant disclosure takes the housings of the electronic devices for example. Furthermore, after different examinations and evaluations considered by the inventor, preferred parameters for various cleaning procedures are listed in Table 2 below:

TABLE 2

| Cleaning | Parameter | |
|---|---|---|
| procedure | Parameter 1 | Parameter 2 |
| Degreasing | Degreasing agent: 3-5% | Temperature: 50° C. |
| Water rinsing | Temperature: about 25° C. | 2 times |
| Alkaline etching | NaOH: 220 g/L | Temperature: 25° C. |
| Water rinsing | Temperature: about 25° C. | 2 times |
| Chemical polishing | Phosphoric Acid | Temperature: 90-93° C. |
| Water rinsing | Temperature: about 25° C. | 2 times |
| Pickling | Nitric Acid: 5 ml/L | Temperature: about 25° C. |
| Water rinsing | Temperature: about 25° C. | 2 times |

After cleaning the aluminum alloy substrate, the substrate is ready for the next step, which is the first anodic treatment (step S25). For the first anodic treatment, the aluminum alloy substrate 10 is immersed into an electrolytic solution and connected to the anode, while the cathode is connected to a carbon or lead plate before a current and a voltage is applied through the solution. The purpose of the first anodic treatment is to form a first oxide layer that can be dyed with a first color on the substrate 10.

For the first anodic treatment, the electrolyte comprises a solution of sulfuric acid in water at a concentration of 20~25 wt %, sulfuric acid. The temperature of the electrolyte is approximately 15~25° C. The applied voltage ranges from 10-16 volts, with the current density ranging from 0.8~2.0 A/m$^2$. The anodizing time is less than 45 minutes and preferably no less than 10 minutes.

The first oxide layer formed by the first anodic treatment is then subjected to a first dying process. Thus, the dyed first oxide layer will have a first color. Dyeing can be done through an absorptive or chemical dyeing process. To increase corrosion resistance and dye retention, the dyed first oxide layer is further sealed. A nickel acetate type sealing agent is utilized for sealing. The sealing procedure is described by the following parameters shown in Table 3:

TABLE 3

| Procedure | Parameter | |
|---|---|---|
| | Parameter 1 | Parameter 2 |
| Sealing | Nickel acetate type of sealing agent: 1-15 g/L | Temperature: 5-95° C.; Time: 5-90 minutes |
| Water rinsing | Temperature: 5-95° C. | 1-5 times |

With regard to Table 3, the substrate 10 preferably is immersed into a solution of nickel acetate in water at a concentration of 7 g/L of nickel acetate. The temperature of the sealing agent is approximately 90±5° C. and the immersion time is approximately 30 minutes.

Alternatively, a texturizing step can be conducted on the substrate 10 prior to step S25. For instance, the operation of sand blasting can be adopted to form matted surface or stripe effect on the substrate 10.

Figure 3:
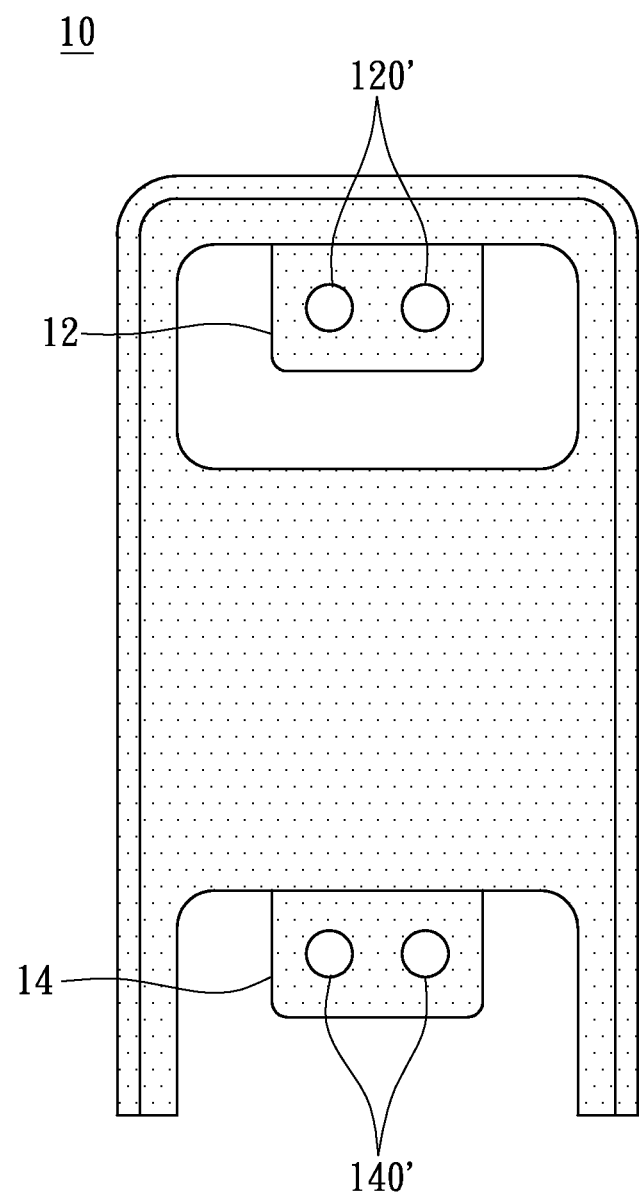
FIG. 3 shows a schematic view of the formation of conductive holes on the fixing portions of the substrate in accordance to the instant disclosure.

Please refer to FIG. 3 in conjunction with step S26, which is the removal of at least some of the first oxide layer from the fixing portion. Preferably, the removal process is carried out by the CNC machine. Specifically speaking, the first oxide layer on the inner surfaces of the conductive holes 120 and 140 are removed to form new conductive holes 120' and 140'. Preferably, the removal of the first oxide layer is done by expanding the width of the conductive holes, such as through drilling. The expanded holes are utilized later for conducting electricity during the second anodic treatment. In other words, the conductive holes 120' and 140' formed can provide a better conducting effect during the second anodic treatment. Alternatively, if there is sufficient unused surface area on the fixing portions, additional conductive holes can be further formed on the fixing portions.

Next, for step S27 as indicated in FIG. 1, at least some of the first oxide layer is removed from the outer surface of the substrate 10. The exposed metallic surface upon removal of the first oxide layer is to undergo a second anodic treatment in forming a second color. Similarly, special surface finishes, such as stripe effect, can be implemented during this step.

Next, for step S28 as indicated in FIG. 1, a second anodic treatment is performed on the substrate 10. The anodic electrodes are connected to the conductive holes 120' and 140' of the fixing portions 12 and 14 to form a second oxide layer that can be dyed with a second color on the exposed metallic surface of the substrate 10. During the second anodic treatment, the substrate 10 is immersed into a solution of sulfuric acid in water at a concentration of 20~25 wt %. The temperature of the electrolyte is approximately 15~25° C. The applied voltage ranges from 6~25 volts, and the anodizing time is 1~20 minutes.

The second anodic treatment also includes a second dyeing sub-procedure, which allows the newly formed oxide layer to be dyed with a second color. Similarly, the second coloring process can be done through an absorptive or chemical dyeing operation. Then, the dyed second oxide layer is sealed by utilizing the nickel acetate type sealing agent. The temperature of the sealing agent is approximately 80~99° C., and the immersion time of the second oxide layer in the sealing agent is 1~30 minutes. The sealed substrate 10 is then put to dry.

Figure 4:
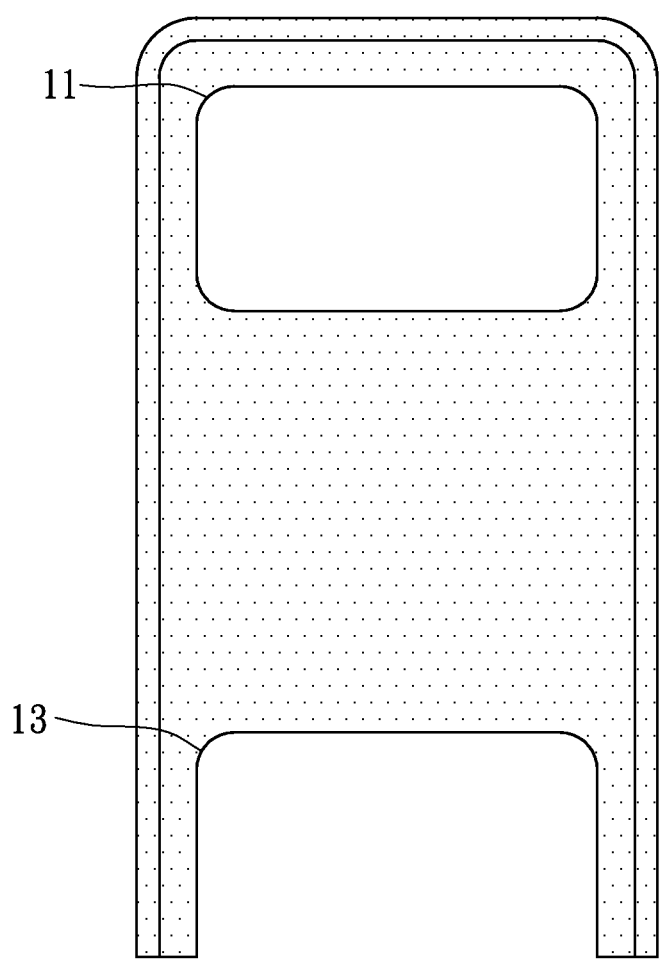
FIG. 4 shows a schematic view of the substrate upon removal of the fixing portions in accordance to the instant disclosure.

The fixing portions of the instant disclosure are utilized as conductive portions during the first and second anodic treatments. Therefore, for the second anodic treatment, the substrate 10 can be electrically conductive without grinding the inner surface thereof. Furthermore, by using means such as drilling, the unwanted portions of the first oxide layer can be easily removed from the substrate 10 to assure proper electrical conduction. Finally, for step S29, the fixing portions 12 and 14 can be removed after all the processes are completed as shown in FIG. 4. Since the fixing portions 12 and 14 are arranged on the inner surface of the substrate 10, the removal of the fixing portions 12 and 14 will not affect the substrate 10 aesthetically.

Last of all is the process for removal of ash such that the aluminum alloy substrate can be cleaned and ash-like particles attached on the surface thereof can be removed. Generally, the substrate is cleaned by acidic solution followed by water rinsing. The parameters of the post-anodic treatment cleaning process are shown below in Table 4:

TABLE 4

| Cleaning procedure | Parameter | |
|---|---|---|
| | Parameter 1 | Parameter 2 |
| Ash removing | Acid: 1-500 ml/L | Temperature: 5-95° C. |
| Water rinsing | Temperature: 5-95° C. | 1-5 times |

The instant disclosure is applicable for housings of electronic products. Preferably, a solution of nitric acid in water at a concentration of 20 ml/L and a temperature of approximately 25° C. is used. The substrate 10 is then rinsed by water having a water temperature of 25° C. at least two times.

It is worth noting that before the removal of the fixing portions 12 and 14, another conductive hole can be further formed to provide conductivity for a third anodic treatment. In other words, additional conductive holes can be formed on the fixing portions 12 and 14 if sufficient area is provided. Therefore, by repeating the steps S26 and subsequent steps, a new (third) color can be formed on the substrate 10.

Moreover, a step can be further included where the conductive holes 120' and 140' are expanded for the third anodic treatment. Such step only requires using a large drill bit to expand the conductive holes 120' and 140' in providing adequate electrical conductivity for future anodic treatment. After all anodizations have been completed, the fixing portions 12 and 14 are then removed.

Thus, through the aforementioned method of forming a multicolor surface, the following characteristics and functions can be provided. The fixing portions of the substrate formed by the processing machines provide conductive areas for the electrodes during the anodic treatments. Hence, the metallic substrate can obtain different oxide layers that can be dyed with different colors through the anodic treatments. Furthermore, the conductivity of the second anodic treatment can be assured without grinding the inner surface of the substrate. Hence, the substrate can be processed more efficiently with a lower risk of being damaged. Furthermore, the substrate will not be affected aesthetically by the removal of the fixing portions.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method of forming a multicolor surface, comprising the steps of:
   providing an aluminum-based substrate having an outer surface and an inner surface;
   performing a mechanical process on the substrate;
   forming at least one fixing portion on the inner surface of the substrate;

drilling the fixing portion to form at least one hole thereon;

performing a first anodic treatment to form a first oxide layer with a first color on the outer surface of the substrate, wherein an anodic electrode is fastened to the hole of the fixing portion to make electrical connection between the fixing portion and the anodic electrode;

drilling the fixing portion to remove the first oxide layer from an inner edge of the hole thereof, wherein the hole is expanded through drilling;

removing a portion of the first oxide layer to partially expose the outer surface of the substrate;

performing a second anodic treatment to form a second oxide layer with a second color on the exposed outer surface of the substrate by connecting the anodic electrodes to the expanded hole, wherein the second color is different from the first color; and removing the fixing portion.

2. The method of forming a multicolor surface according to claim 1, wherein the fixing portion is capable of being selectively engaged by a computer numerical control (CNC) machine.

3. The method of forming a multicolor surface according to claim 1, wherein prior to the first anodic treatment, the substrate is subjected to a cleaning process, and wherein the cleaning process includes degreasing, alkaline etching, first pickling, chemical polishing, and second pickling.

4. The method of forming a multicolor surface according to claim 1, wherein prior to the first anodic treatment, the substrate is subjected to a texturizing step.

5. The method of forming a multicolor surface according to claim 1, wherein the current density during the first anodic treatment ranges from 0.8 to 2.0 $A/dm^2$ and the anodizing time is less than 45 minutes.

6. The method of forming a multicolor surface according to claim 1, wherein prior to the second anodic treatment, the outer surface of the substrate stripped of the first oxide layer is subjected to a texturizing step.

7. The method of forming a multicolor surface according to claim 1, wherein the applied voltage of the second anodic treatment ranges from 6 to 25 volts and the anodizing time ranges from 1 to 20 minutes.

8. The method of forming a multicolor surface according to claim 1, wherein both of the first and second anodic treatment steps include a dyeing and sealing processes for the respective oxide layers.

9. The method of forming a multicolor surface according to claim 8, wherein for the sealing process, the anodized substrate is immersed into a solution of nickel acetate in water at a concentration of 7 g/L and a temperature of $90\pm5°$ C., while the immersing time is 30 minutes.

10. The method of forming a multicolor surface according to claim 1, wherein before the removal of the fixing portion, at least one additional hole is formed on the fixing portion for a third anodic treatment.

11. The method of forming a multicolor surface according to claim 1, wherein before the removal of the fixing portion, further comprising a step of expanding the width of the hole in preparation for a third anodic treatment.

* * * * *